US008874419B2

(12) United States Patent
Da Veiga et al.

(10) Patent No.: US 8,874,419 B2
(45) Date of Patent: Oct. 28, 2014

(54) METHOD OF DEVELOPING A PETROLEUM RESERVOIR FROM A FACIES MAP CONSTRUCTION

(75) Inventors: Sébastien Da Veiga, Paris (FR); Mickaële Le Ravalec, Rueil Malmaison (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 240 days.

(21) Appl. No.: 12/962,716

(22) Filed: Dec. 8, 2010

(65) Prior Publication Data

US 2011/0153285 A1 Jun. 23, 2011

(30) Foreign Application Priority Data

Dec. 23, 2009 (FR) ...................................... 09 06330

(51) Int. Cl.
| | | |
|---|---|---|
| *G06G 7/48* | (2006.01) | |
| *G06F 7/60* | (2006.01) | |
| *G06F 17/10* | (2006.01) | |
| *G01V 11/00* | (2006.01) | |
| *G01V 1/30* | (2006.01) | |

(52) U.S. Cl.
CPC . *G01V 11/00* (2013.01); *G01V 1/30* (2013.01); *G01V 2210/665* (2013.01)
USPC .............................................. 703/10; 703/2

(58) Field of Classification Search
CPC .... G01V 11/00; G01V 1/30; G01V 2210/665
USPC ....................................................... 703/10, 2
See application file for complete search history.

(56) References Cited

U.S. PATENT DOCUMENTS

| | | | | |
|---|---|---|---|---|
| 7,079,953 | B2 * | 7/2006 | Thorne et al. .................... | 702/16 |
| 7,340,385 | B2 * | 3/2008 | James .............................. | 703/10 |
| 7,392,166 | B2 * | 6/2008 | Le Ravalec-Dupin et al. . | 703/10 |
| 7,516,055 | B2 * | 4/2009 | Strebelle ......................... | 703/10 |
| 2006/0041410 | A1 | 2/2006 | Strebelle | |
| 2006/0241920 | A1 | 10/2006 | Le Ravalec-Dupin et al. | |

FOREIGN PATENT DOCUMENTS

| | | |
|---|---|---|
| FR | 2 869 421 | 10/2005 |
| WO | WO 2009/138290 A2 | 11/2009 |

OTHER PUBLICATIONS

Caers, Jef, and Tuanfeng Zhang, "Multiple-point geostatistics: a quantitative vehicle for integrating geologic analogs into multiple reservoir models." (2002).*
Caers, Jef, and Todd Hoffman. "The probability perturbation method: a new look at Bayesian inverse modeling." Mathematical geology 38.1 (2006): 81-100.*

(Continued)

*Primary Examiner* — Aniss Chad
(74) *Attorney, Agent, or Firm* — Antonelli, Terry, Stout & Kraus, LLP.

(57) ABSTRACT

A method of developing a petroleum reservoir, wherein a facies map representative of the reservoir is constructed from petrophysical property maps. A grid cell visiting order is defined by selecting the visiting order that first passes through the cells where the facies are the most discriminated. Then, in each cell i, according to the visiting order, and for various facies values k, the likelihood defined by the probability of obtaining in cell i the values of observed petrophysical properties is calculated, knowing that the facies in cell i is facies k, and knowing on the one hand already identified facies values $V^*_{<i}$ and, the values of the petrophysical properties of the previously visited cells. The facies value that maximizes the likelihood in cell i is associated with each cell i of the grid.

16 Claims, 3 Drawing Sheets

(56) References Cited

OTHER PUBLICATIONS

Dempster, A. P. et al: "Maximum Likelihood from Incomplete Data via the EM Algorithm," *Journal of the Royal Statistical Society*, Series B 39(1) (1977), pp. 1-38.

Galli, A. et al: "The Pros and Cons of the Truncated Gaussian Method," *Geostatistical Simulations*, pp. 217-233, 1994.

Le Loc'h, G. et al: 1996 "Truncated Plurigaussian Method: Theoretical and Practical Point of View," *Geostatistics Wollongong '96* 1, E.Y. Baafi and N.A. Schofields eds, Kluwe, 211-222.

Le Ravalec, M., et al: "The FFT Moving Average (FFT-MA) Generator: An Efficient Numerical Method for Generating and Conditioning Gaussian Simulations," *Mathematical Geology*, vol. 32, No. 6, 2000, p. 701-723.

Freulon, Xavier et al: "Conditioning a Gaussian Model with Inequalities," in *Geostatistics Troia '92*, A. Soares, ed., Kluwer Academic Publishers, Dordrecht, The Netherlands, pp. 201-212 (1993).

Geweke, J.: "Efficient Simulation from the Multivariate Normal and Student t-distribution Subject to Linear Constraints," *Computer Science and Statistics: Proceedings of the Twenty-Third Symposium on the Interface* (1991), pp. 571-578.

Mazet, Vincent, et al: Simuler une Distribution Normale à Support Positif à Partir de Plusieurs Lois Candidates, GRETSI, Louvain-la-neuve, Belgique (2005), 4 pgs.

Fernández, Pedro J, et al: "Perfectly Random Sampling of Truncated Multinormal Distributions," *Adv. In Appl. Probab*, 39 (2007) 973-990.

Hu, Lin Y.: "Gradual Deformation and Iterative Calibration of Gaussian-related Stochastic Models," *Math. Geol.*, 32(1), 87-108, Jan. 2000.

Le Ravalec-Dupin et al: "Conditioning to Dynamic Data: An Improved Zonation Approach," *Petroleum Geosciences*, 7, S9-S16, 2001.

Arslan I., et al: "Facies Modeling Using Multiple-Point Statistics: An Example from a Carbonate Reservoir Section Located in a Small Part of a Large Shelf Margin of Arabian Gulf, UAE", Society of Petroleum Engineers, SPE, Nov. 3, 2008-Nov. 6, 2008, pp. 1-9.

Zhang T., et al: "3D Porosity Modeling of a Carbonate Reservoir Using Continuous Multiple-Point Statistics Simulation", Society of Petroleum Engineers, SPE, vol. 11, No. 3, Sep. 1, 2006, pp. 375-379, XP008109678.

Strebelle, Sebastien B., et al: "Reservoir Modeling Using Multiple-Point Statistics", Society of Petroleum Engineers, SPE, Jan. 1, 2001, pp. 97-107, XP008109711.

Ravalec, M. et al: "Conditioning Truncated Gaussian Realizations to Static and Dynamic Data", Society of Petroleum Engineers, SPE, Dec. 2004, pp. 475-480, XP002596421.

\* cited by examiner

PRIOR ART

METHOD OF DEVELOPING A PETROLEUM RESERVOIR FROM A FACIES MAP CONSTRUCTION

BACKGROUND OF THE INVENTION

1. Filed of the Invention

The present invention relates to the petroleum industry, and more particularly to petroleum reservoir characterization by construction of a representation of the reservoir referred to as reservoir model. In particular, the invention relates to a method of constructing a facies map associated with the reservoir model. This map is used to update a reservoir model after acquiring new measurements within the petroleum reservoir.

2. Description of the Prior Art

Optimization and development of petroleum reservoirs is based on the most accurate possible description of the structure, the petrophysical properties, the fluid properties, etc., of the studied reservoir. A tool is used accounting for these aspects in an approximate way which is a reservoir model. Such a model is a model of the subsoil, representative of both its structure and its behavior. Generally, this type of model is represented in a computer and it is referred to as a numerical model.

These models which are well known and widely used in the petroleum industry, allow determination of many technical parameters relative to prospecting, study or development of a reservoir such as, for example, a hydrocarbon reservoir. In fact, a reservoir model is representative of the structure of the reservoir and of the behavior thereof. It is thus for example possible to determine which zones are the most likely to contain hydrocarbons, the zones in which it can be interesting or necessary to drill an injection well in order to enhance hydrocarbon recovery, the type of tools to use, the properties of the fluids used and recovered, etc. These interpretations of reservoir models in terms of "technical development parameters" are well known, even though new methods are regularly developed. It is thus crucial, in the petroleum industry, to construct a model as precise as possible. Integration of all the available data is therefore essential.

The purpose of a reservoir model thus is to best account for all the information relative to a reservoir. A reservoir model is representative when a reservoir simulation provides historical data estimations that are very close to the observed data. What is referred to as historical data are the production data obtained from measurements in wells in response to the reservoir production (oil production, water production of one or more wells, gas/oil ratio (GOR), production water proportion (water cut)), and/or repetitive seismic data (4D seismic impedances in one or more regions, etc.). A reservoir simulation is a technique allowing simulation of fluid flows within a reservoir by software referred to as flow simulator.

History matching modifies the parameters of a reservoir model, such as permeabilities, porosities or well skins (representing damages around the well), fault connections, facies, etc., in order to minimize the differences between the simulated and measured historical data. The parameters can be linked with geographic regions, such as permeabilities or porosities around one or more wells, or within one or more facies.

A reservoir model has a grid with N dimensions (N>0 and generally two or three). Each cell is assigned the value of a property characteristic of the zone which is being studied. It can be, for example, the porosity or the permeability distributed in a reservoir. FIG. 1 shows a facies map of a petroleum reservoir, making up a two-dimensional reservoir model. The grid pattern represents the cells. The grey cells represent a reservoir facies zone and the white cells represent a non-reservoir facies zone.

The value of a property characteristic of the zone is referred to as regionalized variable. It is a continuous variable, spatially distributed, and representative of a physical phenomenon. From a mathematical point of view, it is simply a function z(u) taking a value at each point u (the cell of the grid) of a field of study D (the grid representative of the reservoir). However, the variation of the regionalized variable in this space is too irregular to be formalized by a mathematical equation. In fact, the regionalized variable represented by z(u) has both a global aspect relative to the spatial structure of the phenomenon studied and a random local aspect.

This random local aspect can be modelled by a random variable (VA). A random variable is a variable that can take a certain number of realizations z according to a certain probability law. Continuous variables such as seismic attributes (acoustic impedance) or petrophysical properties (saturation, porosity, permeability) can be modelled by VAs. Therefore, at point u, the regionalized variable z(u) can be considered to be the realization of a random variable Z.

However, to properly represent the spatial variability of the regionalized variable, it must be possible to take into account the double aspect, both random and structured. One possible approach, of probabilistic type, involves the notion of random function. A random function (FA) is a set of random variables (VA) defined in a field of study D (the grid representative of the reservoir), i.e. $\{Z(u), u^*D\}$, also denoted by Z(u). Thus, any group of sampled values $\{z(u_1), \ldots, z(u_n)\}$ can be considered to be a particular realization of random function $Z(u)=\{Z(u_1), \ldots, Z(u_n)\}$. Random function Z(u) allows accounting for both the locally random aspect (at $u^*$, the regionalized variable $z(u^*)$ being a random variable) and the structured aspect (via the spatial probability law associated with random function Z(u)).

The realizations of a random function provide stochastic reservoir models. From such models, it is possible to appreciate the way the underground zone studied works. For example, simulation of the flows in a porous medium represented by numerical stochastic models allows, among other things, to predict the reservoir production and thus to optimize its development by testing various scenarios.

Construction of a stochastic reservoir model can be described as follows:

First, static data are measured in the field (logging, measurements on samples taken in wells, seismic surveys, . . . ) and, dynamic data are measured (production data, well tests, breakthrough time, . . . ), whose distinctive feature is that they vary in the course of time as a function of fluid flows in the reservoir.

Then, from the static data, a random function characterized by its covariance function (or similarly by its variogram), its variance and its mean is defined.

A set of random numbers drawn independently of one another is defined: it can be, for example, a Gaussian white noise or uniform numbers. Thus, an independent random number per cell and per realization is obtained, Finally, from a selected geostatistical simulator and from the set of random numbers, a random draw in the random function is performed, giving access to a (continuous or discrete) realization representing a possible image of the reservoir. Conventionally, the random draw is performed in a hierarchical context. First, the reservoir is randomly populated by a realization of the random function associated with the facies, conditionally to the punctually observed facies. Then, the porosity is generated randomly on each facies, conditionally to the porosity data obtained on the facies which is considered. The horizontal permeability is then simulated according to its associated random function, conditionally to the facies and to the porosities drawn before, and to the permeability measurements taken in the field. The reservoir is then populated by a random realization of the vertical permeability, conditionally to all the previous simulations and to the permeability punctually obtained data.

At this stage, the dynamic data have not been considered. They are integrated in the reservoir models via an optimization or a calibration. An objective function measuring the difference between the dynamic data measured in the field and the corresponding responses simulated for the model under consideration is defined. The goal of the optimization procedure is to modify little by little this model so as to reduce the objective function. Parametrization techniques allow these modifications to be provided while preserving coherence with respect to the static data.

In the end, the modified models are coherent with respect to the static data and the dynamic data. It must be possible to update these models complete. When new data are available, the model has to be modified to also take account of these new data. Moreover, the calibration and parametrization techniques are improving continuously. Consequently, reservoir engineers frequently need to go back over reservoir models elaborated and calibrated in the past. The goal is to refine these models and to update them by means of the data acquired since the time when the model had been initially elaborated.

However, an essential difficulty still remains when going back over numerical models elaborated in the past. In fact, to apply a method allowing refinement of the calibration of an existing realization, the number of random numbers which, when given to the geostatistical simulator, provides the numerical model (the realization) in question has to be known. Now, in general, this information no longer exists. Similarly, the variogram (or covariance) model characterizing the spatial variability in the underground zone of the attribute represented and necessary to characterize the random function is no longer known. The latter point is less important insofar as a study of the existing numerical model can allow finding this variogram again.

French Patent 2,869,421 discloses a method allowing reconstruction of numerical stochastic models for a previously determined random function, to identify a set of random numbers which, given as input data to a geostatistical simulator, leads to a realization similar to the numerical model being considered. However, this technique applies to continuous variables representative, for example, of the porosity to the case of a reservoir comprising a single facies.

SUMMARY OF THE INVENTION

The invention is an alternative method of constructing a facies map representative of an underground reservoir. The invention also relates to an alternative method of developing petroleum reservoirs, wherein measurements are taken within the reservoir, the facies map is updated to account for these measurements and the reservoir development scheme is modified according to the updated map.

The method according to the invention is computer implemented for constructing a facies map representative of a petroleum reservoir, from a grid of a set of cells and of maps of petrophysical properties representative of the reservoir and associated with the grid. The method comprises:

a) using a computer to define a visiting order for the cells of the grid, by determining in each cell of the grid a facies discrimination degree and by defining the visiting order in increasing order of the degree;
b) in each cell i, according to the visiting order, and for facies values k, using a computer to calculate a likelihood defined by a probability of obtaining in cell i the petrophysical property values of the maps, knowing that the facies in cell i is facies k, and knowing facies values already identified in previously visited cells and, the petrophysical property values of the previously visited cells; and
c) using a computer to associate with each cell i of the grid a facies value maximizing the likelihood in cell i and
d) for calculating for each cell of the grid a ratio between a probability of observing the petrophysical property maps if the facies of cell i is a most probable facies and a probability of observing the petrophysical property maps if the facies of cell i is a second most probable facies, with the visiting order being determined by the calculate ratio of the cells with a cell of the grid having the calculated ratio which is greatest being visited first followed by successively visiting remaining cells of the grid which have not been visited in an order determined by a descending magnitude of the calculated ratio of each of the remaining cells.

According to the invention, a visiting order can be defined for the cells of the grid by calculating in each cell of the grid a ratio between a probability of observing the petrophysical property maps if the facies of cell i is the most probable facies and a probability of observing the petrophysical property maps if the facies of cell i is the second most probable facies, and by defining the visiting order in increasing order of the ratio. That is for calculating for each cell of the grid a ratio is calculated between a probability of observing the petrophysical property maps if the facies of cell i is a most probable facies and a probability of observing the petrophysical property maps if the facies of cell i is a second most probable facies, with the visiting order being determined by the calculated ratio of the cells with a cell of the grid having the calculated ratio which is greatest being visited first followed by successively visiting remaining cells of the grid which have not been visited in an order determined by a descending magnitude of the calculated ratio of each of the remaining cells.

The likelihood in cell i can be calculated by calculating in each cell i is:
a joint probability law for the facies, $P(V^*_{<i},V_i)$, defined as a probability that a value of the facies in cell i is $V_i$, knowing facies values $V^*_{<i}$ already identified in previously visited cells;
the joint probability law for the petrophysical properties, defined as a probability that each petrophysical value takes a given value $U_{<i}^1, \ldots, U_{<i}^L, U_i^1, \ldots, U_i^L$ in each cell of the grid, knowing facies values $V^*_{<i}$ already identified in previously visited cells and for any facies value $V_i$ in cell i; and
a product of the probability laws.

According to an embodiment, the petrophysical properties follow, for each facies, probability laws of unknown parameters θ, and the stages are carried out as follows:
a) defining the grid cell visiting order by:
i) fixing a first initial value for each parameter;
ii) determining a most probable facies value;
iii) estimating a second value for each parameter as a function of the facies determined in ii); and iv) repeating ii) until value convergence for each parameter occurs.

b) in each cell i, calculating a likelihood and associating with each cell i of the grid a facies value that maximizes the likelihood in cell l;

c) estimating a third value for each parameter as a function of the facies in b); and d) repeating b) until value convergence for each parameter or until convergence of the associated facies occurs.

According to an embodiment, the total number of facies K is unknown, and the following is carried out:

fixing a maximum number of facies $K_{max}$;

for each value k ranging between 1 and $K_{max}$, determining in each cell i the likelihood in cell l; and determining a total number of facies K by selecting value k for which a likelihood is maximum.

The invention also relates to a method of developing a petroleum reservoir according to a given development scheme, from petrophysical property maps representative of the reservoir. According to this method, a facies map representative of the reservoir is constructed, the map comprising a grid each cell of which has a facies value, and measurements allowing better characterization of the reservoir are taken therein. The method comprises:

constructing the facies map according to the method of the invention described above;

modifying the map to account for the measurements, by carrying out a geostatistical simulation constrained by the measurements, with a geostatistical simulator;

modifying the reservoir development scheme by accounting for the modified map; and developing the reservoir using the modified development scheme.

The measurements are preferably selected from among the following data: logs, core analysis data and production data.

The geostatistical simulator is preferably selected from among the following simulators: simulator using a sequential indicator simulation method, a simulator using the truncated Gaussian method and a simulator using the pluri-Gaussian method.

Finally, according to an embodiment, the map is modified by applying a gradual deformation method.

BRIEF DESCRIPTION OF THE DRAWINGS

Other features and advantages of the method according to the invention will be clear from reading the description hereafter of embodiments given by way of non limitative examples, with reference to the accompanying figures wherein.

DETAILED DESCRIPTON OF THE INVENTION

Figure 1:
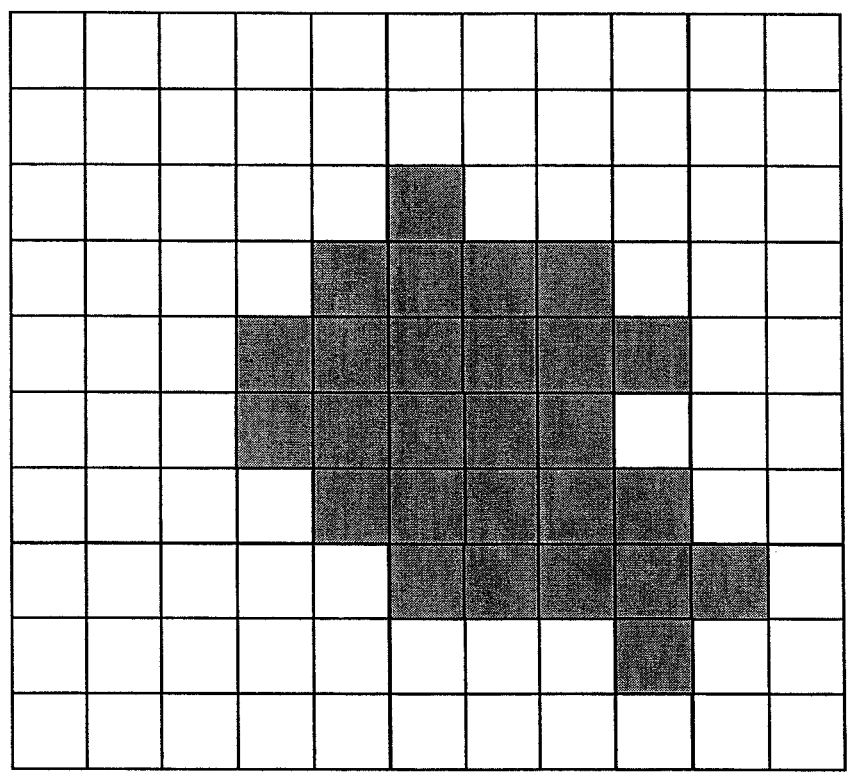
FIG. 1 shows a facies map of a petroleum reservoir.

The method according to the invention allows development of a petroleum reservoir for which maps representative of petrophysical properties such as permeability, porosity, saturations, etc., are available. The method allows construction of a facies map representative of the petroleum reservoir, from the petrophysical property maps. The facies can be lithologic facies such as limestone, sandstone, clay lithologies, etc., or seismic facies which are well known.

The maps are grids each cell of which has geographical coordinates, and each cell is associated with one or more petrophysical properties or facies.

In order to facilitate comprehension of the invention, a mathematical formalism is used to describe the invention. The following notations are therefore used:

$L \geq 1$ is the number of petrophysical properties considered for facies identification in each cell of the grid.

For $l=1, \ldots, L$, $U^l$ designates the l-th petrophysical property available for identification.

For $i=1, \ldots, n$, $U_i^l$ is the value of the l-th petrophysical property observed at point $(x_i, y_i, z_i)$ of the grid. All the values observed are grouped together in a vector $U^l = (U_i^l)_{i=1, \ldots, n}$ of size n.

For $l=1, \ldots, L$ and $k=1, \ldots, K$, $U^{l,k}$ designates the vector made up of the data of the l-th petrophysical property observed on facies k.

For $i=1, \ldots, n$, $V^*_i \in \{1, \ldots, K\}$ is the facies identified by the method at point $(x_i, y_i, z_i)$ of the grid. The facies map identified therefore corresponds to the data of vector $V^* = (V^*_i)_{i=1, \ldots, n}$ of size n.

For $l=1, \ldots, L$ and $k=1, \ldots, K$, $\theta_{l,k}$ is the vector of the parameters of the probability law of property $U^l$ on facies k. The vector containing all the parameters is denoted by $\theta = (\theta_{l,k})_{l=1, \ldots, L; k=1, \ldots, K}$.

For any random vector X, the vector made up of these i-1-th first coordinates is denoted by $X_{<i} = (X_1, \ldots, X_{i-1})$.

For a vector $X = (X_1, \ldots, X_n)$ of any size n, $P(X) = P(X_1, \ldots, X_n)$ designates the joint probability law of vector $(X_1, \ldots, X_n)$.

For m vectors $X^1 = (X_1^1, \ldots, X_n^1), \ldots, X^m = (X_1^m, \ldots, X_n^m)$ of any size n, $P(X^1, \ldots, X^m)$ designates the joint probability law of vector $(X_1^1, \ldots, X_n^1, \ldots, X_1^m, \ldots, X_n^m)$.

For m vectors $X^1 = (X_1^1, \ldots, X_n^1), \ldots, X^m = (X_1^m, \ldots, X_n^m)$ of any size n and a vector $Y = (Y_1, \ldots, Y_n)$ of size n such that $P(Y) > 0$, the conditional probability law of $(X^1, \ldots, X^m)$ is denoted by $P(X^1, \ldots, X^m | Y)$, knowing Y defined by $$P(X^1, \ldots, X^m | Y) = \frac{P(X^1, \ldots, X^m, Y)}{P(Y)}$$

These notations allow the goal to be reformulated which is identifying the facies map from petrophysical property maps amounting to calculating vector $V^* = (V^*_i)_{i=1, \ldots, n}$ from L vectors $U^l = (U_i^l)_{i=1, \ldots, n}$ for $l=1, \ldots, L$.

The construction of a facies map from petrophysical data maps is based on the "maximum likelihood" technique. The principle of this technique is as follows:

observing data generated according to a specific probability law depending on parameters some of which at least are unknown;

estimating the unknown parameters by the maximum likelihood estimator. The latter is obtained by writing the probability of having observed the available data (likelihood). Estimating these parameters then determines the value of the parameters that maximizes this probability.

In mathematics, what is referred to as likelihood is the probability of obtaining a certain set of observed data, assuming that the latter follow a specific parameter-dependent probability law.

Thus, the probability of observing the available petrophysical property maps is defined and facies distribution $V^* = (V^*_i)_{i=1, \ldots, n}$, which maximizes this probability, is determined.

Likelihood LH associated with the petrophysical property maps, knowing parameters $\theta$, is written as follows for any facies distribution V:

$$LH(U^1, \ldots, U^L, V|\theta) = P(U^1, \ldots, U^L, V|\theta) = P(V) \times P(U^1, \ldots, U^L|V, \theta)$$

Identifying vector V* that maximizes this quantity optimizes in dimension n, the size of the grid of the map. In practice, n is of the order of one million and therefore it is not possible to carry out a direct optimization.

The method is based on a sequential optimization of this likelihood using Bayes' formula.

Thus, the construction of a facies map from petrophysical data maps comprises the following:
 a) selecting a visiting order for the cells of the grid'
 b) in each cell i of the grid according to the visiting order:
  i. calculating the likelihood in cell i knowing petrophysical data $U_{<i}^1, \ldots, U_{<i}^L$ and the facies values $V^*_{<i}$ identified in the previously visited cells with the likelihood, for any facies value $V_i$ in i, is $$LH(U_{<i}^1, \ldots, U_{<i}^L, V^*_{<i}, U_i^1, \ldots, U_i^L, V_i|\theta) = P(V^*_{<i}, V_i) \times P(U_{<i}^1, \ldots, U_{<i}^L, U_i^1, \ldots, U_i^L|V^*_{<i}, V_i, \theta);$$
 and ii. calculating value $V^*_i$ of $V^*_i$ that maximizes this quantity; and
 c) moving to the next cell, following the visiting order, until all the cells have been visited.

Stages a) and b) of the method are now described in detail.

a) Selecting a Grid Cell Visiting Order

Sequential identification of facies vector V* greatly depends on the visiting order which is selected. If identification is started in cells where the facies are poorly discriminated (for cells where there is no facies markedly more probable than the others), there is a great risk of identifying the incorrect facies, and resulting in this error being propagated to the cells which are visited by the sequential algorithm.

In order to limit these risks, a visiting order first passing through cells where the facies are the most discriminated is selected wherein a facies discrimination degree is determined in each cell of the grid and the visiting order is defined in increasing order of this degree.

Preferably, the method provided for constructing such a visiting order first disregards all the spatial correlations of the facies, the spatial correlations of each petrophysical datum and the correlations between the petrophysical properties themselves. When all these correlations are disregarded, the likelihood is simplified and it is no longer necessary to adopt a sequential approach. In this case, facies identification amounts to calculating a likelihood $P(V_i) \times \Pi_{l=1}^{L} P(U_i^l|V_i, \theta)$ in each cell i of the grid, independently of the other cells of the grid.

The variable $k^*_i$ which is the most probable value of facies $V_i$, and $k^{**}_i$ which is the second most probable value are then calculated in each cell of the grid. The cells where the facies are the most discriminated are the cells where the ratio of the likelihood for $V_i = k^*_i$ to the likelihood for $V_i = k^{**}_i$ is the highest. This ratio allows classification of cells to form a visiting order wherein the cells where this ratio is the highest are visited first. That is, for each cell of the grid a ratio is calculated between a probability of observing the petrophysical property maps if the facies of cell i is a most probable facies and a probability of observing the petrophysical property maps if the facies of cell i is a second most probable facies, with the visiting order being determined by the calculate ratio of the cells with a cell of the grid having the calculated ratio which is greatest being visited first followed by successively visiting remaining cells of the grid which have not been visited in an order determined by a descending magnitude of the calculated ratio of each of the remaining cells.

b) Calculating the Likelihood and the Facies that Maximizes this Quantity

It can stated that the likelihood in each cell of the grid is expressed as follows:

$$LH(U_{<i}^1, \ldots, U_{<i}^L, V^*_{<i}, U_i^1, \ldots, U_i^L, V_i|\theta) = P(V^*_{<i}, V_i) \times P(U_{<i}^1, \ldots, U_{<i}^L, U_i^1, \ldots, U_i^L|V^*_{<i}, V_i, \theta).$$

Therefore it is necessary to calculate:

$P(V^*_{<i}, V_i)$ which is the joint probability law of the facies, and
$P(U_{<i}^1, \ldots, U_{<i}^L, U_i^1, \ldots, U_i^L|V^*_{<i}, V_i, \theta)$ which is the joint probability law of the petrophysical properties, knowing the optimum distribution of facies $V^*_{<i}$ in the cells visited before, and for any value of facies $V_i$ at point i.

Various methods can be used to calculate $P(V^*_{<i}, V_i)$ which is the joint probability law of the facies:

If the petrophysical property maps have not been generated from a facies map, the following method is used:

The facies are assumed to be spatially independent such that $P(V^*_{<i}, V_i) = P(V^*_{<i}) \times P(V_i) \propto P(V_i)$, where $P(V_i)$ is then equal to the proportion of facies $V_i$ in cell i.

If the petrophysical property maps have been generated from a facies map (lost, not known) from a known method, the following methods are proposed:
 if the sequential indicator simulation procedure (SISim) has been used, $P(V^*_{<i}, V_i) = P(V^*_{<i}) \times P(V_i|V^*_{<i}) \propto P(V_i|V^*_{<i})$ which does not depend on the value to be optimized $V_i$, and this conditional probability is estimated by indicator kriging.
 if the truncated Gaussian procedure has been used, this joint probability law can generally not be calculated, because it involves calculating the distribution function of a Gaussian vector of dimension i, which is not possible numerically when i is too great. In this case, the method according to the invention adds a simulation of truncated Gaussian law variables $Y_i$. The joint probability law is then replaced by $P(V_i, Y_{<i}) \propto P(V_i|Y_{<i}) = P(a_{V_i-1} \leq Y_i < a_{V_i}|Y_{<i})$ where $Y_i|Y_{<i}$ is a one-dimensional Gaussian variable of mean and variance dependent on $Y_{<i}$, as explained in the following article:
 P. J. Fernandez, P. A. Ferrari and S. Grynberg, Perfectly Random Sampling of Truncated Multinormal Distributions, Adv. in Appl. Probab, 39 (2007) 973-990.
 if the pluri-Gaussian procedure has been used, the same method as for the truncated Gaussians is implemented by replacing the joint probability law by:

$$P((Y_i^1, Y_i^2) \in \mathcal{E}_{V_i} | Y_{<i}^1, Y_{<i}^2) = \sum_{j=1}^{n_{V_i}} \varepsilon_j P(a_{V_i-1} \leq Y_i^1 < b_{V_i} | Y_{<i}^1) \times P(c_{V_i-1} \leq Y_{<i}^2 < d_{V_i} | Y_{<i}^2)$$

where $Y_i^1|Y_{<i}^1$ and $Y_i^2|Y_{<i}^2$ are Gaussian variables of mean and variance respectively dependent on $Y_{<i}^1$ and $Y_{<i}^2$.

Joint probability law $P(U_{<i}^1, \ldots, U_{<i}^L, U_i^1, \ldots, U_i^L|V^*_{<i}, V_i, \theta)$ depends on the way the petrophysical properties have been generated on each facies.

If they are considered to be independent, decomposition as follows can be written:

$$P(U^1_{<i}, \ldots, U^L_{<i}, U^1_i, \ldots, U^L_i | V^*_{<i}, V_i, \theta) = \prod_{l=1}^{L} P(U^l_{<i}, U^l_i | V^*_{<i}, V_i, \theta)$$

If furthermore it is assumed that each petrophysical property is a Gaussian field for a given facies, it can be written:

$$P(U^1_{<i}, \ldots, U^L_{<i}, U^1_i, \ldots, U^L_i | V^*_{<i}, V_i, \theta) = \prod_{l=1}^{L} \prod_{k=1}^{K} f_{l,k}(U^{l,k}_{<i+1}; \theta_{l,k})$$

where $f_{l,k}(\bullet; \theta_{l,k})$ is the density function of a Gaussian law of parameters $\theta_{l,k}$.

Usually, in reservoir engineering, the petrophysical properties are generated hierarchically. For a fixed facies, the porosity (denoted by $U^1$ for example) is simulated according to a given probability law, conditionally to the porosities observed at some points. This information is introduced in probability law $P(U^1_{<i}, U^1_i | V^*_{<i}, V_i, \theta)$. Then the next stage simulates the horizontal permeabilities (denoted by $U^2$ and $U^3$ for example) conditionally to the observed permeability values and to the previously generated porosity, according to a fixed probability law. This information is introduced in probability law $P(U^2_{<i}, U^2_i, U^3_{<i}, U^3_i | U^1_{<i}, U^1_i, V^*_{<i}, V_i, \theta)$. Finally, the vertical permeability denoted by $U^4$ is simulated conditionally to the observed permeabilities and the simulated permeabilities according to probability law $P(U^4_{<i}, U^4_i | U^2_{<i}, U^2_i, U^3_{<i}, U^3_i, V^*_{<i}, V_i, \theta)$.

Finally, the likelihood is written in this case:

$$P(U^4_{<i}, U^4_i | U^2_{<i}, U^2_i, U^3_{<i}, U^3_i, V^*_{<i}, V_i, \theta) \times P(U^2_{<i}, U^2_i, U^3_{<i}, U^3_i | U^1_{<i}, U^1_i, V^*_{<i}, V_i, \theta) \times P(U^1_{<i}, U^1_i | V^*_{<i}, V_i, \theta).$$

Variants

According to an embodiment, parameters $\theta$ of the petrophysical properties on each facies are unknown. The following is carried out:

a) defining the grid cell visiting order:
  i) fixing a first initial value for each parameter;
  ii) determining a most probable facies value;
  iii) estimating a second value for each parameter according to the facies determined in ii);
  iv) repeating ii) until value convergence for each parameter occurs;
b) in each cell i, calculating a likelihood and associating with each cell i of the grid a facies value maximizing a likelihood in cell 1;
c) estimating a third value for each parameter according to an associated facies in b); and
d) repeating b) until value convergence for each parameter or until convergence of the associated facies occurs.

Thus, identification is carried out iteratively by a parameter value $\theta$ being initially set, identification is performed, the identification result being used to estimate parameters $\theta$, this new estimation is used to perform a new identification, the parameters are re-estimated, and so on until convergence occurs. It is the EM (Expectation-Maximization) algorithm principle introduced in the following article:

Dempster, N. Laird and D. Rubin, *Maximum Likelihood From via the EM Algorithm*, Journal of the Royal Statistical Association, Series B 39(1) (1977), 1-38.

Once the visiting order is obtained, the same iterative principle is used for b) and c) of the method with vector $\theta$ being fixed at a value provided at a last iteration of the EM algorithm, this value is used for b) and c), identification allows estimation of parameters $\theta$ wherein the estimation is used to carry out b) and c) again and the new identification allows to re-estimation of the parameters, and so on until convergence is reached. Here, the algorithm convergence can be studied in two different ways by either the estimation of the parameters vector no longer evolves, or the facies identification does not change between two iterations of the algorithm.

According to another embodiment, the total number of facies K is unknown. An iterative approach is adopted again here. First a value $K_{max}$ corresponding to the maximum number of facies is fixed, typically $K_{max}$ is selected of the order of ten approximately. For each value of K ranging between 1 and $K_{max}$, identification is carried out (iteratively if $\theta$ is unknown) while taking the precaution of keeping the final likelihood value. The value of K that provides the greatest final likelihood then corresponds to the most probable number of facies. Thus, the following stages are carried out:

fixing a maximum number of facies $K_{max}$;
for each value k ranging between 1 and $K_{max}$, determining in each cell i the likelihood in cell 1; and
determining a total number of facies K by selecting a value k for which the likelihood is maximum.

Using the Facies Map

The invention also relates to a method of developing a petroleum reservoir according to a given development scheme, from petrophysical property maps representative of the reservoir. This method comprises using a facies map representative of the reservoir and constructed according to the invention.

Figure 2:
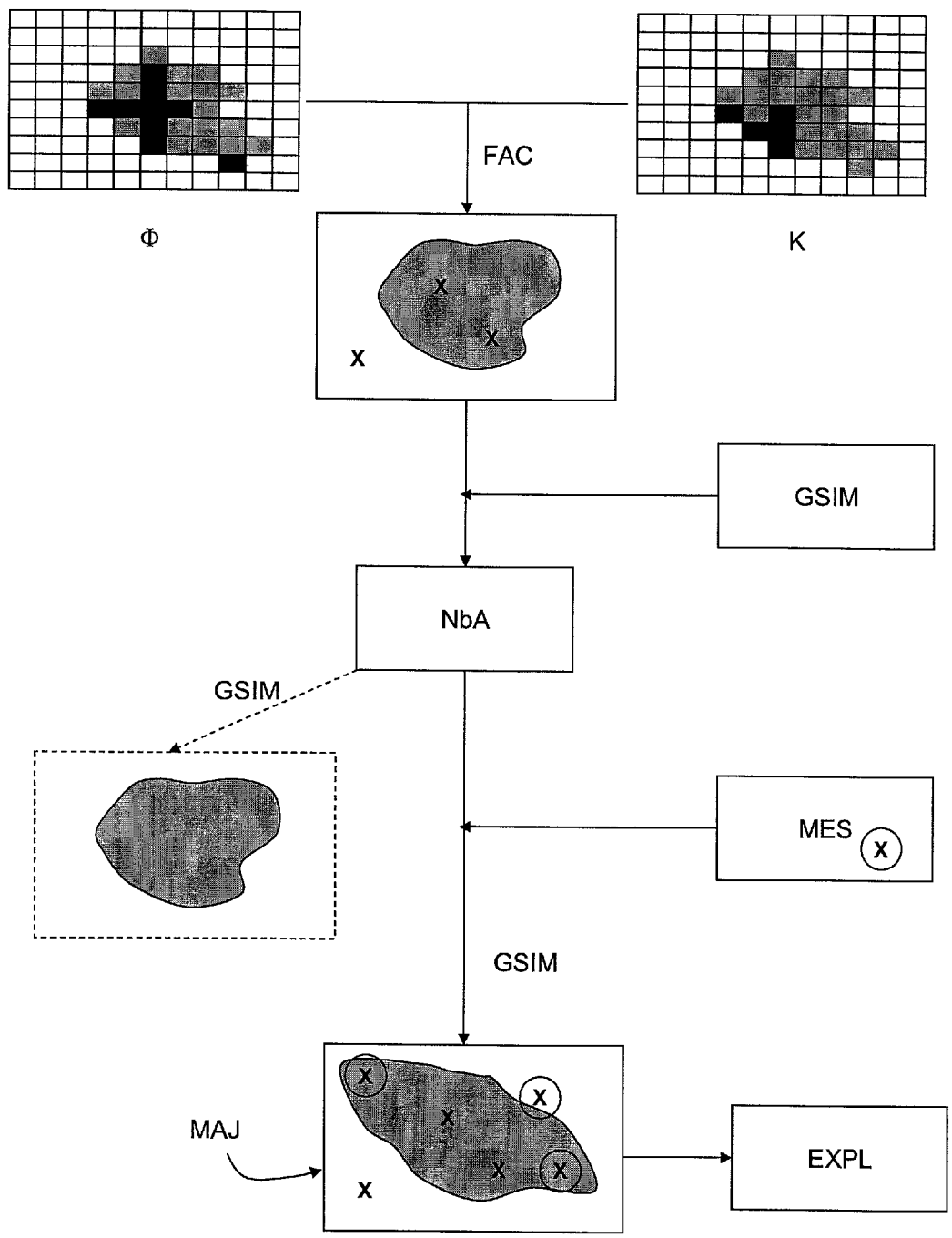
FIG. 2 illustrates the method according to the invention for petroleum reservoir development.

FIG. 2 illustrates the stages of the method for developing petroleum reservoirs. It comprises:
1. Constructing a facies map (FAC);
2. Taking measurements within the reservoir (MES);
3. Updating the facies map to account for the measurements (MAJ); and
4. Modifying the reservoir development scheme and developing the reservoir (EXPL).

1. Constructing a Facies Map (FAC)

The method according to the invention, as described above, is used. A porosity map ($\Phi$) and a permeability map (K) can, for example, be used.

2. Taking Measurements Within the Reservoir

During development of a reservoir, new measurements allowing better characterization of the reservoir and therefore optimization of the development thereof are taken. For example:

new logs allowing knowledge of the porosity or the permeability for example all along the well in which logging is performed;

new core analysis data allowing knowledge of the porosity or the permeability for example all along the well where the cores are taken; and new production data allowing history matching to be performed. As long as the reservoir is developed, new time-varying production data are collected, such as, for example, the pressures in the wells or oil, water or gas flow rates.

3. Updating the Facies Map Accounting for the Measurements

In order to update the facies map, a geostatistical simulation constrained by the measurements can be performed by a geostatistical simulator. One of the following simulators can be used: a simulator using the sequential indicator simulation method, a simulator using the truncated Gaussian method, and a simulator using the pluri-Gaussian method.

According to an embodiment, the following method is used:

A. Selecting a Geostatistical Simulator

A geostatistical simulator is selected. Geostatistical simulation methods produce random function realizations from a set of random numbers, such as, for example, a Gaussian white noise or independent uniform numbers. There are many geostatistical simulators for generating a facies map. The following methods are preferably used within the context of two-point statistics:

the sequential indicator simulation described in: Goovaerts, P., Geostatistics for Natural Resources Evaluation, Oxford University Press, New York (1997), the truncated Gaussian method described in: Galli, A., Beucher, H., Le Loc'h, G. and Doligez, B. (1994), The pros and the cons of the truncated Gaussian method, Geostatistical Simulations, 217-233, the pluri-Gaussian method described in: Le Loc'h, G. and Galli, A. (1996), Truncated Plurigaussian Method: Theoretical and Practical Point of View, Geostatistics Wollongong '96 1, E. Y. Baafi and N. A. Schofields eds, Kluwe, 211-222.

All these procedures involve the generation of random numbers which, after being converted according to a technique specific to each one of them, allow generation of the facies map.

The simulation procedure of a facies map $V=(V_1, \ldots, V_n)$ conditionally to observations $\{v_a, a=1, \ldots, n_a\}$, for each one of these three geostatistical simulators, can be recalled. For all these techniques, the common notations are as follows:

$D=\{(x_i, y_i, z_i), i=1, \ldots, n\}$ is the discretized subdomain of $R^3$ corresponding to the centre of the cells of the reservoir grid;

K is the number of different facies present in the reservoir;

For $a=1, \ldots, n_a$, $v_a \in \{1, \ldots, K\}$ designates the facies observed at point $(x_a, y_a, z_a)$;

For $i=1, \ldots, n$, $V_i \in \{1, \ldots, K\}$ designates the facies simulated at point $(x_i, y_i, z_i)$;

$$\varphi(x) = \frac{1}{\sqrt{2\pi}} e^{-\frac{x^2}{2}}$$

is the probability density function of the standard Gaussian law; and $\Phi(x) = \int_{-\infty}^{x} \phi(t) dt$ is the distribution function of the standard Gaussian law.

Sequential Indicator Simulation (SISim)

The simulation procedure is as follows:

i. Converting observations (measurements) $v_a$ to a vector of K indicators, defined by:

$$i_{a,k} = \begin{cases} 1 & \text{if } v_a = k \\ 0 & \text{otherwise} \end{cases}$$

for $k = 1, \ldots, K$.

ii. Constructing a random path visiting all the cells of the reservoir grid, except those for which an observation (measurement or cell already simulated) $v_a$ is available.

iii. In each cell i of the path
  (a) estimating the occurrence probability of each facies k by an indicator kriging technique. The conditional data are the values of the indicators defined in (1) to which $V_{<i}=(V_1, \ldots, V_{i-1})$ with the previously simulated facies being added;
  (b) correcting these estimated probabilities;
  (c) constructing the empirical distribution function $F_{V_i|v_a V_{<i}}(t)$ associated with the probabilities;
  (d) generating a random number $p_i$ according to the uniform law in interval [0,1];
  (e) the facies simulated at point i corresponds to the interval to which ρ belongs such that $V_i = k^*$ if $F_{V_i|v_a V_{<i}}(k^*-1) < p \leq F_{V_i|v_a V_{<i}}(k^*)$ (f) moving to a next cell on a path and repeating (a) to (d).

Simulation by a Truncated Gaussian Method

Simulation of a facies map by the truncated Gaussian method generates facies by truncating a realization $Y(x,y,z)$ of a stationary Gaussian field of zero mean, of unit variance and of correlogram ρ(h) where h is the Euclidean distance between two points. Realization $Y(x,y,z)$ can be obtained by Gaussian sequential simulation as described: Goovaerts, P., *Geostatistics for Natural Resources Evaluation*, Oxford University Press, New York (1997); or by the FFT-MA Algorithm Introduced in the following article: Le Ravalec M., Noetinger B. and Hu L. Y., The FFT Moving Average (FFT-MA) Generator: An Efficient Numerical Method for Generating and Conditioning Gaussian Simulations, *Math. Geol.*, 32(6) (2000).

Generically, the facies map is given by the following relation. In each cell i of the grid, it is defined:

$$V(x_i, y_i, z_i) = \sum_{k=1}^{K} k \mathbf{1}\{a_{k-1} \leq Y(x_i, y_i, z_i) < a_k\}$$

where $-\infty = a_0 < a_1 < \ldots < a_{k-1} < a_k < \ldots < a_K = +\infty$ are the truncation thresholds. Their value is determined from the proportions of each facies. These proportions can vary according to the cells (non-stationary case) or be constant over the entire grid (stationary case). By denoting by $\pi_k$ the proportion of facies k for $k=1, \ldots, K$, the relation between the thresholds and the proportions is as follows:

$$a_k(x, y, z) = \Phi^{-1}\left(\sum_{j=1}^{k} \pi_j(x, y, z)\right)$$

for $k=1, \ldots, K$. $\Phi^{-1}$ designates the inverse of the distribution function of the standard normal law. The simulation procedure is as follows:
  a. Calculating the thresholds from the facies proportions;
  b. Generating a realization Y of a Gaussian field according to one of the two aforementioned methods; and
  c. Identifying the facies to be assigned to a cell according to the interval to which the value of Y generated in this cell belongs.

If facies observations $\{v_a, a=1, \ldots, n_a\}$ are available, realization $Y(x,y,z)$ is replaced by its conditional version $Y(x,y,z)|\{a_{v_a-1} \leq Y_a < a_{v_a}, a=1, \ldots, n_a\}$ that can be generated according to the method described in the following article:

Freulon, X., and de Fouquet, C., Conditioning a Gaussian model with Inequalities, in *Geostatistics Troia '92*, A. Soares, ed., Kluwer Academic Publishers, Dordrecht, The Netherlands, 201-212 (1993).

Simulation by Means of the Pluri-Gaussian Method

The pluri-Gaussian approach is an extension of the truncated Gaussian method in the sense that it truncates several Gaussian fields. This procedure has been introduced to add some flexibility to the modelling of transitions between facies. It allows modelling of a large variety of geological environments. The method is described here in the simplest case of multi-Gaussian generation by only two independent Gaussian fields being considered. Extension of the method to the case of several Gaussian fields that can be correlated is direct.

Two independent standard stationary Gaussian fields $Y^1$ and $Y^2$ of respective correlograms $\rho_1(h)$ and $\rho_2(h)$ are considered. The transitions between facies are defined by truncation rules expressed in a form of a threshold mask. The principal axes of the mask correspond to the values taken by $Y^1$ and $Y^2$. Regions, which are often rectangular, divide space $(Y^1, Y^2)$ into subdomains with each subdomain being associated with a facies. The bounds of these subdomains are the thresholds used for truncating $Y^1$ and $Y^2$. The surface area of the subdomains, and consequently the thresholds, depends on the proportions of the facies. In the case of non-stationary proportions, the threshold mask can evolve according to the cell which is considered.

Generically, by denoting by $\epsilon_k$ the rectangular region associated with facies k for k=1, ..., K, the facies map is defined by:

$$V(x, y, z) = \sum_{k=1}^{K} k 1\{(Y^1(x, y, z), Y^2(x, y, z)) \in \mathcal{E}_k\}$$

Conventionally, regions $\epsilon_k$ are assumed to be rectangular. It is also possible to consider subdomains associated with a given facies in form of the union of several rectangular regions:

$$\mathcal{E}_k = \bigcup_{i=1}^{n_k} \mathcal{E}_{j,k}$$

with $$\mathcal{E}_{j,k} = \{(x, y) \in R^2, a_{j,k} \le x < b_{j,k}, c_{j,k} \le y < d_{j,k}\}$$

The simulation procedure thus is as follows:
i. Calculating the thresholds from the facies proportions and the threshold mask;
ii. Generating two realizations $Y^1$ and $Y^2$ of Gaussian fields by sequential Gaussian simulation or by the FFT-MA method; and
iii. Identifying the facies to be assigned to a cell according to the values of $Y^1$ and $Y^2$ generated for this cell.

B. Identifying a set of Random Numbers for reconstructing the Initial Map

The facies map is reconstructed from the generation procedure selected in A. It identifies random numbers which, when used in the generation procedure, produce initial facies map which is considered.

According to the invention, a set of random numbers (NbA) allowing reconstruction of the initial map by inverting the random number generation algorithm of the selected geostatistical simulator (GSIM) is identified. It is considered that the initial map has been obtained by the geostatistical simulator. The result (F) of this simulator is known for each point of the map which it is the initial map itself. This result then just has to be inverted:

$$GSIM(NbA) = F \Rightarrow NbA = GSIM^{-1}(F)$$

This inversion procedure is illustrated for each geostatistical simulator of stage A.

Reconstruction for the Sequential Indicator Simulation

The reconstruction method provided is designed to reconstruct a facies map $V=(V_1, \ldots, V_n)$, of a set of random numbers $(p_1, \ldots, p_n)$ which, when used in the SISim procedure, produce the original facies map $V=(V_1, \ldots, V_n)$. The method provided is as follows:

(1) Converting observations $v_a$ (measurement and/or cell already simulated) to a vector of K indicators, defined by:

$$i_{\alpha,k} = \begin{cases} 1 & \text{if } v_\alpha = k \\ 0 & \text{otherwise} \end{cases}$$

for $k = 1, \ldots, K$.

(2) Constructing a random path visiting all the cells of the grid;
(3) In each cell i of the path;
  (a) Estimating an occurrence probability of each facies k by an indicator kriging technique. The conditional data are values of the indicators defined in (1) to which $V_{<i}=(V_1, \ldots, V_{i-1})$ is added, the previously simulated facies;
  (b) Normalizing these estimated probabilities;
  (c) Constructing the empirical distribution function $F_{V_i|v_\alpha V_{<i}}(t)$ associated with these probabilities;
  (d) Generating a random number $p_i$ according to the uniform law on interval $[F_{V_i|v_\alpha V_{<i}}(V_i-1), F_{V_i|v_\alpha V_{<i}}(V_i)]$; and
  (e) Moving to the next cell on the path and repeating (a) to (d).

By construction during (d), vector $(p_1, \ldots, p_n)$ is asymptotically distributed according to a uniform law on interval $[0,1]$. If the same random path is used and the uniform random numbers given by the method in the SISim procedure, it is certain to generate the same facies map as the original one. Thus, the set of random numbers $p_i$ calculated in stage (d) constitutes the set of random numbers which are sought.

The solution obtained with the method is not unique: other random numbers and other paths can generate the same facies map.

Reconstruction for the Truncated Gaussian

The reconstruction method provided is intended, from a known facies map $V=(V_1, \ldots, V_n)$, to generate a realization Y of a standard stationary Gaussian field of given correlogram $\rho(h)$ which, when truncated with thresholds $\{a_k, k=1, \ldots, K\}$, produces the same facies map as the original one. From a statistical point of view, generating a realization of such a Gaussian field is equivalent to generating a sample of a standard multinormal vector $(Y_1, \ldots, Y_n)$ conditioned by $\{a_{V_i-1} \le Y_i < a_{V_i}, i=1, \ldots, n\}$. The distribution of this vector is known as a truncated multinormal distribution. It is not possible to generate a sample of this law in one pass. The method uses the following sequential approach:

(1) Constructing a random path visiting all the cells of the grid;
(2) In each cell i, the probability density function of $Y_i$, knowing constraints $C_{\le i}=\{a_{V_j}^{-1} \le Y_j < a_{V_j}, j=1, \ldots, i\}$ and values $Y_{<i}=(Y_1, \ldots, Y_{i-1})$ simulated on the previously visited cells, is:

$$g_i(y_i | C_{<i}, Y_{<i}) = \frac{\frac{1}{\hat{\sigma}_i}\rho\left(\frac{y_i - \hat{\mu}_i}{\hat{\sigma}_i}\right)}{\Phi\left(\frac{a_{V_{ii}-1} - \hat{\mu}_i}{\hat{\sigma}_i}\right) - \Phi\left(\frac{a_{V_{ii}} - \hat{\mu}_i}{\hat{\sigma}_i}\right)} 1\{a_{V_{j-1}} \le Y_j < a_{V_j}, j = 1, \ldots, i\}$$

$\hat{\mu}_i$ and $\hat{\sigma}_i$ are the mean and the standard deviation of simple kriging of $Y_i$, knowing $Y_{<i}$;

(3) Generating a realization according to this probability density function using one of the usual algorithms, described for example in the following documents:
J. Geweke, Efficient Simulation from the Multivariate Normal and Student t-distribution Subject to Linear Constraints, *Computing Science and Statistics: Proceedings of the Twenty-Third Symposium on the Interface* (1991) 571-578
V. Mazet, D. Brie et J. Idier, Simuler une Distribution Normale à Support Positif à Partir de Plusieurs Lois Candidates, *GRETSI*, Louvain-la-neuve, Belgique (2005)
P. J. Fernandez, P. A. Ferrari and S. Grynberg, Perfectly Random Sampling of Truncated Multinormal Distributions, *Adv. in Appl. Probab*, 39 (2007) 973-990'
(4) Moving to the next cell and repeating (2) to (3) until all the cells have been visited'
(5) When realization Y is known and is a continuous realization of given correlogram, a random number identification technique applicable to continuous data (and not discrete data such as the facies data) is used to identify a set of random numbers allowing reconstruction of realization Y by stochastic simulation.

Advantageously, identification of the random numbers comprises using one of the following techniques, described in document French Patent 2,869,421 which are optimization, relaxation, filtering, sequential method and a combination of these techniques.

The identification by an optimization technique comprises minimization of an objective function measuring a difference between a numerical stochastic model ($y_{ref}$) and a simulated model (y). The gradient of the objective function with respect to the random numbers is used to reconstruct the model by optimization.

The identification by filtering technique is based on the Wiener filter. It is suitable for geostatistical simulators that depend on a convolution product. This algorithm allows, in a single iteration, reconstruction of continuous models. In the spectral domain, the Fourier transform is written as the product of the transform of the Gaussian white noise (i.e. the set of random numbers) by a function F, the square root of the power spectrum. Implementation of the Wiener filter involves replacing the inverse of F, $F^1$, by $\bar{F}/(|F|^2+\epsilon)$ where is a sufficiently small constant. Gaussian white noise z is then estimated from:

$$z = TF^{-1}\left(\frac{\bar{F}}{(|F|^2 + \varepsilon)} Y_{ref}\right)$$

where $TF^{-1}$ means: inverse Fourier transform.

By construction, the realization obtained by this method meets the threshold constraints imposed and it therefore produces, after truncation, the same facies map as the original one. The method provided produces a solution that is not unique and that can differ from the reference facies realization.

Reconstruction for the Pluri-Gaussian

The reconstruction method is similar to the method provided in the case of the truncated Gaussian with two realizations $Y^1$ and $Y^2$ of standard stationary Gaussian fields of known correlograms $\rho_1(h)$ and $\rho_2(h)$ which, when combined with the given threshold mask, produce a facies map similar to the original one ($V_1, \ldots, V_n$). The method provided is here again based on a sequential approach:

(1) Constructing a random path visiting all the cells of the grid;
(2) In each cell i, the probability density function of ($Y_i^1$, $Y_i^2$), knowing constraints $C_{<i}=\{(Y_j^1, Y_j^2) \in \epsilon_{V_j}, j=1, \ldots, i\}$ and values ($Y_{<i}^1, Y_{<i}^2$) simulated on the previously visited cells, is the following mixture:

$$g(y_i^1, y_i^2 | C_{<i}, Y_{<i}^1, Y_{<i}^2) = \sum_{j=1}^{n_{V_i}} \varepsilon_j g_j^1(y_i^1) g_j^2(y_i^2)$$

with:

$$g_j^1(y_i^1) = \frac{\frac{1}{\hat{\sigma}_i^{(1)}} \rho\left(\frac{y_i^1 - \hat{\mu}_i^{(1)}}{\hat{\sigma}_i^{(1)}}\right)}{\Phi\left(\frac{b_{j,V_i} - \hat{\mu}_i^{(1)}}{\hat{\sigma}_i^{(1)}}\right) - \Phi\left(\frac{a_{j,V_i} - \hat{\mu}_i^{(1)}}{\hat{\sigma}_i^{(1)}}\right)}$$

$$g_j^2(y_i^2) = \frac{\frac{1}{\hat{\sigma}_i^{(2)}} \rho\left(\frac{y_i^2 - \hat{\mu}_i^{(2)}}{\hat{\sigma}_i^{(2)}}\right)}{\Phi\left(\frac{d_{j,V_i} - \hat{\mu}_i^{(2)}}{\hat{\sigma}_i^{(2)}}\right) - \Phi\left(\frac{c_{j,V_i} - \hat{\mu}_i^{(2)}}{\hat{\sigma}_i^{(2)}}\right)}$$

where $\epsilon_j = |\epsilon_{j,V_i}|/|\epsilon_{V_i}|$ and $\hat{\mu}_i^{(1)}$ et $\hat{\sigma}_i^{(1)}$ (resp. $\hat{\mu}_i^{(2)}$ and $\hat{\sigma}_i^{(2)}$) are the mean and the standard deviation of simple kriging of $Y_i^1$ (resp. $Y_i^2$) knowing $Y_{<i}^1$ (resp. $Y_{<i}^2$)

(3) Generating a realization according to this probability density function;
(4) Moving to the next cell and repeating (2) to (3) until all the cells have been visited; and
(5) When realization Y is known with Y being a continuous realization of known correlograms, a random number identification technique applicable to continuous data is used (and not discrete data such as the facies data) to identify a set of random numbers allowing to reconstruct realization Y by stochastic simulation.

In the case of truncated Gaussians and pluri-Gaussians, the simulation method and therefore the associated reconstruction method involves Gaussian fields whose correlogram is assumed to be known. If this is not the case, it is necessary to estimate them from the facies map. The mathematical relation between the variogram of the facies map and the variogram of the Gaussian field(s) that have generated it cannot be inverted, as noted in the following document:
J.-P. Chilès and P. Delfiner, Geostatistics. Modeling Spatial Uncertainty, Wiley Series in Probability and Statistics (1999).

The approach provides a series of variograms and selects the one producing an experimental variogram that is the closest to what is observed on the facies map.

The purpose of identifying the set of random numbers is to be able to modify the initial map so that it meets the new measurements taken.

C. Updating the Facies Map

Now that a geostatistical simulator and a set of random numbers have been obtained which, when applied to the simulator, allow reconstruction of the initial map, it is possible to modify the map with usual methods such as:
the gradual deformation method, a geostatistical parametrization technique meeting engineers' needs and presented in the following article:
Hu, L.-Y., 2000, Gradual Deformation and Iterative Calibration of Gaussian Related Stochastic Models, Math. Geol., 32(1), 87-108.).

It makes it possible in fact to resume study of a reservoir and to modify it partially in zones where new data are available, as described in the following document:

Le Ravalec-Dupin, M., Noetinger, B., Hu, L.-Y., and Blanc, G., 2001, Conditioning to Dynamic Data: An Improved Zonation Approach, Petroleum Geosciences, 7, S9-S16.

In order to locally deform a zone of the reservoir, the gradual deformation method is applied to the random numbers of the cells included in this zone. All of the numbers, those of the target zone and those of the host rock domain, are then supplied to the stochastic simulator in order to obtain a new realization representing the reservoir. This new realization differs from the initial realization in the target zone and in a transition zone that surrounds the target zone. The advantage of returning to random numbers for gradual deformation is that the continuity of the realization is preserved.

4. Modifying the Reservoir Development Scheme and Developing the Reservoir

Once the facies map is updated from the newly acquired measurements, the reservoir development scheme is reconstructed.

The updated facies map is coherent with all the data available and it is used to predict fluid displacements in the reservoir according to various production scenarios. It is then possible, for this facies map, to try to optimize the future oil production by adjusting for example the position of the wells, the number of wells, etc.

The reservoir is finally developed using the development scheme which has been adjusted. Drilling operations can for example be carried out, or technical production or injection parameters can be modified.

Figure 3:
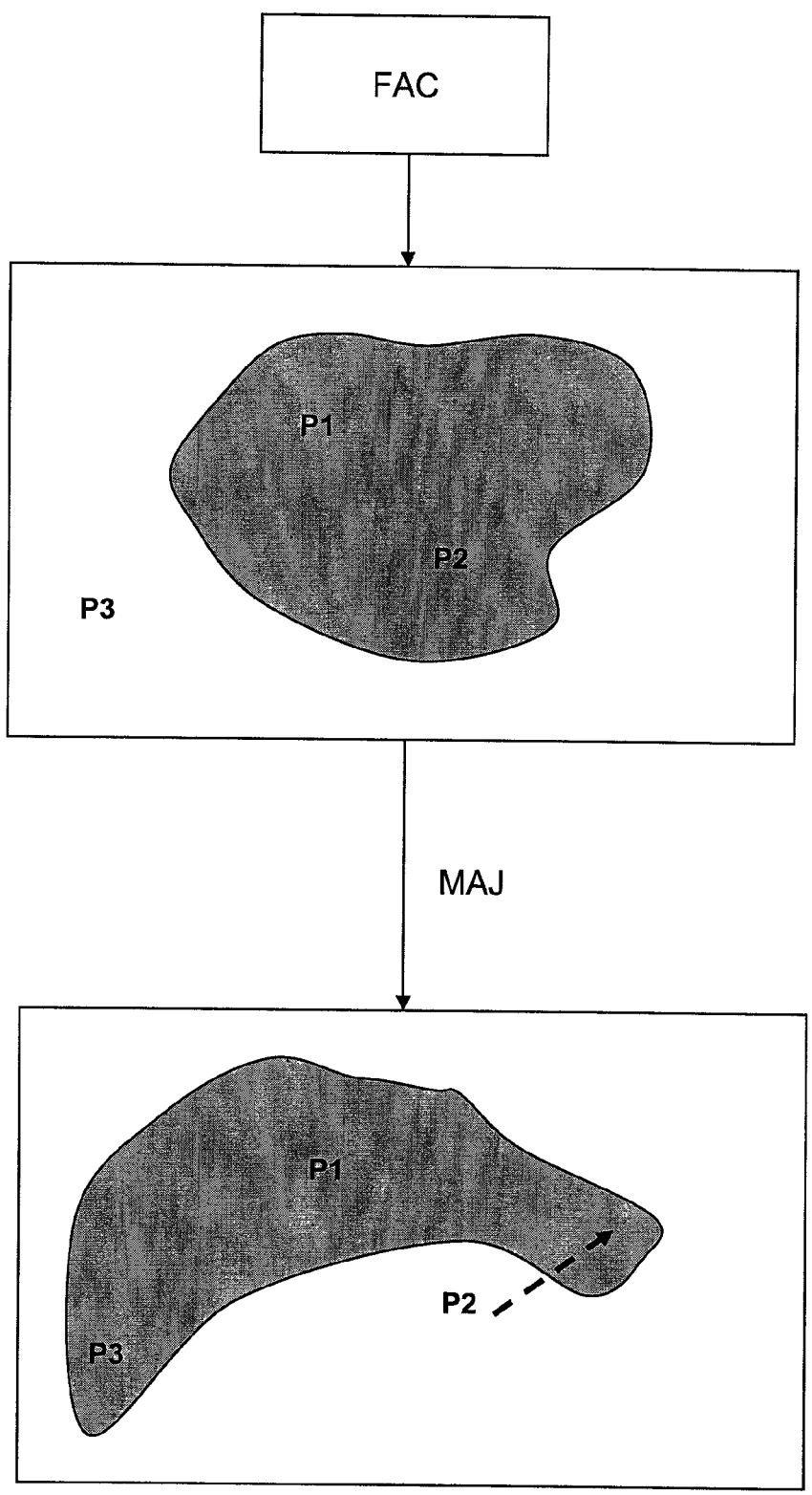
FIG. 3 illustrates necessary development scheme adjustment after modification of the facies map accounting for new measurements.

FIG. 3 illustrates the necessary development scheme adjustment due to the modification of the facies map which accounts for new measurements. In fact, in the initial reservoir development scheme (in grey), well P2 was supposed to reach the reservoir and, conversely, well P3 was supposed to be drilled outside the reservoir. Therefore, for example, well P3 was not under production whereas well P2 had to be drilled deeper so as to reach the reservoir. According to the new map, the trajectory of P2 is going to be modified so that it actually reaches the reservoir. It is also possible to continue drilling at the level of P3 so as to reach the reservoir and bring P3 into production.

The invention claimed is:

1. A method for constructing a facies map representative of a petroleum reservoir, from a grid of a set of cells and petrophysical property maps representative of the reservoir and associated with the grid, comprising:
   a) using a computer to define a visiting order for the cells of the grid;
   b) for each cell i, according to the visiting order and for facies values k using a computer to calculate a likelihood defined by a probability of obtaining in cell i petrophysical property values of the maps, such that a facies in cell i is facies k, and based on knowledge of facies values already identified in previously visited cells and petrophysical property values of the previously visited cells;
   c) using a computer to associate with each cell i of the grid a facies value maximizing the likelihood in cell i; and
   d) calculating for each cell of the grid a ratio between a probability of observing the petrophysical property maps if the facies of cell i is a most probable facies and a probability of observing the petrophysical property maps if the facies of cell i is a second most probable facies, with the visiting order being determined by the calculated ratio of the cells with a cell of the grid having the calculated ratio which is greatest being visited first followed by successively visiting remaining cells of the grid which have not been visited in an order determined by a descending magnitude of the calculated ratio of each of the remaining cells.

2. A method as claimed in claim 1, wherein the likelihood in cell i is calculated by calculating in each cell i:
   a joint probability law for the facies, $P(V^*_{<i}, V_i)$, defined as a probability that a value of a facies in cell i is Vi, with knowledge of facies values $V^*_{<i}$ already identified in previously visited cells;
   a joint probability law for the petrophysical properties, defined as a probability that each petrophysical value has a value $U_{<i}^1, \ldots, U_{<i}^L, U_i^1, \ldots, U_i^L$ in each cell of the grid, with knowledge of facies values $V^*_{<i}$ already identified in previously visited cells and for any facies value Vi in cell 1; and
   the product of the probability laws.

3. A method as claimed in claim 2, wherein the petrophysical properties follow, for each facies, probability laws of unknown parameters θ, comprising:
   a) defining the visiting order of the grid cells:
   i) fixing a first initial value for each parameter;
   ii) determining a most probable facies value;
   iii) estimating a second value for each parameter as a function of the facies determined in ii); and
   iv) repeating ii) until value convergence for each parameter occurs;
   b) in each cell i, calculating the likelihood and associating with each cell i of the grid a facies value maximizing the likelihood in cell 1;
   c) estimating a third value for each parameter as a function of the facies associated in b);
   d) repeating b) until value convergence for each parameter or until convergence of the associated facies occurs.

4. A method as claimed in claim 3, wherein a total number of facies k is unknown, comprising:
   fixing a maximum number of facies $k_{max}$;
   for each value k ranging between 1 and $k_{max}$, determining in each cell i the likelihood in cell 1; and
   determining a total number of facies k by selecting a value k for which the likelihood is maximum.

5. A method as claimed in claim 2, wherein a total number of facies k is unknown, comprising:
   fixing a maximum number of facies $k_{max}$;
   for each value k ranging between 1 and $k_{max}$, determining in each cell i the likelihood in cell 1; and
   determining a total number of facies k by selecting a value k for which the likelihood is maximum.

6. A method as claimed in claim 1, wherein the petrophysical properties follow, for each facies, probability laws of unknown parameters, comprising:
   a) defining the visiting order of the grid cells:
   i) fixing a first initial value for each parameter;
   ii) determining a most probable facies value;
   iii) estimating a second value for each parameter as a function of the facies determined in ii); and
   iv) repeating ii) until value convergence for each parameter occurs;
   b) in each cell i, calculating the likelihood and associating with each cell i of the grid a facies value maximizing the likelihood in cell 1;
   c) estimating a third value for each parameter as a function of the facies associated in b); and
   d) repeating b) until value convergence for each parameter or until convergence of the associated facies occurs.

7. A method as claimed in claim 6, wherein a total number of facies k is unknown, comprising:

fixing a maximum number of facies $k_{max}$;

for each value k ranging between 1 and $k_{max}$, determining in each cell i the likelihood in cell l; and determining a total number of facies k by selecting a value k for which the likelihood is maximum.

8. A method as claimed in claim 1, wherein a total number of facies k is unknown, comprising:

fixing a maximum number of facies $k_{max}$;

for each value k ranging between 1 and $k_{mas}$, determining in each cell i the likelihood in cell l; and determining a total number of facies k by selecting a value k for which the likelihood is maximum.

9. A method of developing a petroleum reservoir according to a development scheme, from petrophysical property maps representative of the reservoir, wherein a facies map representative of the reservoir is constructed, comprising a grid having a set of cells with each cell having a facies value, and measurements allowing better characterization of the reservoir are taken within the reservoir, comprising;

constructing the facies map by defining a visiting order for the cells of the grid for each cell i, according to the visiting order and for facies values k, by calculating a likelihood defined by a probability of obtaining in cell i petrophysical property values of the maps, such that a facies in cell i is facies k, and based on knowledge of facies values already identified in previously visited cells and the petrophysical property values of the previously visited cells, and associating with each cell i of the grid a facies value maximizing the likelihood in cell i;

modifying the map to account for the measurements, by carrying out a geostatistical simulation constrained by the measurements, by using a geostatistical simulator;

modifying the reservoir development scheme by accounting for the modified map;

developing the reservoir using the modified development scheme; and calculating for each cell of the grid a ratio between a probability of observing the petrophysical property maps if the facies of cell i is a most probable facies and a probability of observing the petrophysical property maps if the facies of cell i is a second most probable facies, with the visiting order being determined by the calculated ratio of the cells with a cell of the grid having the calculated ratio which is greatest being visited first followed by successively visiting remaining cells of the grid which have not been visited in an order determined by a descending magnitude of the calculated ratio of each of the remaining cells.

10. A method as claimed in claim 9, wherein the measurements are taken from among logs, core analysis data and production data.

11. A method as claimed in claim 10, wherein the geostatistical simulator is a simulator using a sequential indicator simulation, a simulator using a truncated Gaussian simulation or a simulator using a pluri-Gaussian simulation.

12. A method as claimed in claim 11, wherein the map is modified by applying gradual deformation.

13. A method as claimed in claim 10, wherein the map is modified by applying gradual deformation.

14. A method as claimed in claim 9, wherein the geostatistical simulator is a simulator using a sequential indicator simulation, a simulator using a truncated Gaussian simulation or a simulator using a pluri-Gaussian simulation.

15. A method as claimed in claim 14, wherein the map is modified by applying gradual deformation.

16. A method as claimed in claim 9, wherein the map is modified by applying gradual deformation.

* * * * *